United States Patent
Watanabe et al.

(10) Patent No.: US 8,820,274 B2
(45) Date of Patent: Sep. 2, 2014

(54) FOUR-STROKE ENGINE AND OUTBOARD MOTOR

(75) Inventors: Takahiro Watanabe, Shizuoka (JP); Daisuke Takasu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/466,173

(22) Filed: May 8, 2012

(65) Prior Publication Data

US 2012/0298056 A1  Nov. 29, 2012

(30) Foreign Application Priority Data

May 24, 2011 (JP) ................. 2011-116253

(51) Int. Cl.
| | |
|---|---|
| F02F 1/10 | (2006.01) |
| F02M 61/14 | (2006.01) |
| F02B 23/10 | (2006.01) |
| F01P 3/02 | (2006.01) |
| F02F 1/16 | (2006.01) |
| F02F 1/14 | (2006.01) |

(52) U.S. Cl.
CPC *F02M 61/14* (2013.01); *F01P 3/02* (2013.01); *F02F 1/16* (2013.01); *Y02T 10/125* (2013.01); *F02F 1/10* (2013.01); *F02B 23/104* (2013.01); *F02F 1/14* (2013.01); *F01P 2003/021* (2013.01)
USPC ....................................... 123/41.72

(58) Field of Classification Search
CPC ................ F01P 3/02; F02F 1/10; F02F 1/14; F02F 1/16; F02F 2003/021
USPC ....................................... 123/41.72
See application file for complete search history.

(56) References Cited

U.S. PATENT DOCUMENTS

| | | | | |
|---|---|---|---|---|
| 2,686,513 A | * | 8/1954 | Nallinger | 123/263 |
| 3,156,223 A | * | 11/1964 | Blomquist | 123/264 |
| 4,686,948 A | * | 8/1987 | Smith et al. | 123/193.5 |
| 5,421,301 A | | 6/1995 | Feuling | |
| 5,720,253 A | * | 2/1998 | Matoba et al. | 123/298 |
| 5,735,240 A | | 4/1998 | Ito et al. | |
| 5,778,836 A | * | 7/1998 | Sougawa et al. | 123/65 P |
| 6,065,444 A | * | 5/2000 | Jingu et al. | 123/301 |
| 6,082,327 A | * | 7/2000 | Monnier | 123/305 |
| 6,138,639 A | * | 10/2000 | Hiraya et al. | 123/295 |

(Continued)

FOREIGN PATENT DOCUMENTS

| | | |
|---|---|---|
| GB | 907249 A | 10/1962 |
| JP | 08-200074 A | 8/1996 |

OTHER PUBLICATIONS

Official Communication issued in corresponding European Patent Application No. 12168594.5, mailed on Sep. 20, 2012.

*Primary Examiner* — Lindsay Low
*Assistant Examiner* — Charles Brauch
(74) *Attorney, Agent, or Firm* — Keating & Bennett, LLP

(57) ABSTRACT

A four-stroke engine includes a cylinder head, a cylinder body connected to the cylinder head, and a fuel injection valve. The cylinder head defines a combustion chamber, an intake port that communicates with the combustion chamber, and an exhaust port that communicates with the combustion chamber. The fuel injection valve is held by the cylinder head on a side extending from the exhaust port to the cylinder body. The fuel injection valve is arranged so as to supply a fuel mist directly to the combustion chamber by jetting the fuel mist toward the combustion chamber.

20 Claims, 8 Drawing Sheets

(56) References Cited

U.S. PATENT DOCUMENTS

| | | | |
|---|---|---|---|
| RE37,348 E * | 9/2001 | Kaku et al. | 123/495 |
| 6,516,756 B1 * | 2/2003 | Kato et al. | 123/73 AD |
| 7,464,687 B2 * | 12/2008 | Yamaguchi et al. | 123/298 |
| 2001/0029734 A1 * | 10/2001 | Kato | 60/285 |
| 2002/0072281 A1 | 6/2002 | Takahashi | |
| 2003/0217732 A1 * | 11/2003 | Kataoka et al. | 123/276 |
| 2006/0207527 A1 * | 9/2006 | Saeki et al. | 123/54.4 |
| 2012/0222651 A1 * | 9/2012 | Gentile | 123/347 |
| 2013/0228155 A1 * | 9/2013 | Chapman | 123/470 |

* cited by examiner

FOUR-STROKE ENGINE AND OUTBOARD MOTOR

BACKGROUND OF THE INVENTION

1. Field of the Invention

The present invention relates to a four-stroke engine and an outboard motor provided with the engine.

2. Description of the Related Art

A direct-injection engine is known in which liquid fuel is supplied directly to a combustion chamber so as to improve its output and its fuel efficiency.

In the direct-injection engine, fuel is vaporized in a cylinder, and, as a result, the inside of the cylinder is cooled. Therefore, the output of the engine can be improved by increasing the amount of air with which the cylinder is filled. In addition, the temperature of the inside of the cylinder decreases, and therefore knocking can be prevented. Therefore, fuel efficiency can be improved by increasing the compression ratio of an air-fuel mixture.

United States Patent Application Publication No. US 2002/0072281 A1 (hereinafter, referred to as "US 2002/0072281") discloses an engine for use in an outboard motor that supplies liquid fuel directly to a combustion chamber. In the engine of US 2002/0072281, a fuel injection valve used to inject fuel is disposed near an intake port. Two intake ports are provided for each cylinder, and the fuel injection valve is disposed between the two intake ports.

Japanese Patent Application Publication No. 8-200074 (hereinafter, referred to as "JP 8-200074") discloses an engine that supplies vaporized fuel to a combustion chamber. In the engine of JP 8-200074, a fuel injection valve used to inject fuel is disposed near an exhaust port. Liquid fuel jetted from the fuel injection valve is supplied to a fuel vaporizing chamber. The fuel vaporizing chamber is contiguous to the combustion chamber, and is in a high-temperature state resulting from combustion heat transmitted from the combustion chamber. Therefore, when liquid fuel is supplied to the fuel vaporizing chamber from the fuel injection valve, the fuel is vaporized in the fuel vaporizing chamber. The fuel vaporized in the fuel vaporizing chamber is then supplied to the combustion chamber from near the exhaust port.

SUMMARY OF THE INVENTION

The inventors of preferred embodiments of the present invention described and claimed in the present application conducted an extensive study and research regarding a four-stroke engine and an outboard motor, such as the one described above, and in doing so, discovered and first recognized new unique challenges and previously unrecognized possibilities for improvements as described in greater detail below.

In the engine of US 2002/0072281, the fuel injection valve used to inject fuel is disposed near the intake port. Therefore, fuel injected into the combustion chamber from the fuel injection valve collides with intake air that has a high flow velocity and that has been jetted from the intake port. Therefore, the flow direction of the fuel is greatly changed by the intake air having a high flow velocity, and the fuel is caused to flow in a direction differing from an intended direction. Therefore, a disproportionate flow is liable to occur in the spread of the fuel in the cylinder, and the amount of fuel easily becomes uneven in various areas of the cylinder.

Additionally, in the engine of US 2002/0072281, the fuel injection valve is disposed between the two intake ports, and therefore the intake port is curved. However, if the intake port is greatly curved, fluid resistance in the intake port will become great, and, as a result, the amount of flow of air put into the cylinder from the intake port will decrease. Therefore, an advantageous effect brought about by direct injection deteriorates.

On the other hand, in the engine of JP 8-200074, vaporized fuel is supplied to the combustion chamber. Therefore, the inside of the cylinder cannot be cooled by using the latent heat of vaporization of the fuel. Additionally, in the engine of JP 8-200074, the fuel injection valve is disposed near the exhaust port that is exposed to high-temperature exhaust gas. Therefore, the temperature measured near the fuel injection valve is higher than in an arrangement in which the fuel injection valve is disposed near the intake port. There is a fear that carbon (i.e., soot) will be deposited, and an injection opening of the fuel injection valve will be choked up by the deposited carbon if the temperature is high in the neighborhood of the fuel injection valve.

In order to overcome the previously unrecognized and unsolved challenges described above, one preferred embodiment of the present invention provides a four-stroke engine including a cylinder head, a cylinder body connected to the cylinder head, and a fuel injection valve. The cylinder head defines a combustion chamber, an intake port that communicates with the combustion chamber, and an exhaust port that communicates with the combustion chamber. The fuel injection valve is held by the cylinder head on a side ranging from the exhaust port to the cylinder body. That is, the fuel injection valve is arranged closer to the cylinder body than the exhaust port. The fuel injection valve is arranged so as to supply a fuel mist directly to the combustion chamber by jetting the fuel mist toward the combustion chamber.

According to this arrangement, the fuel injection valve is held by the cylinder head and is arranged closer to the cylinder body than the exhaust port. In other words, the fuel injection valve is disposed between the exhaust port and the cylinder body. Therefore, the distance from the exhaust port to the fuel injection valve is shorter than the distance from the intake port to the fuel injection valve. That is, the fuel injection valve is disposed on the exhaust port side.

A fuel mist jetted from the fuel injection valve is supplied directly to the combustion chamber, and therefore the inside of the cylinder can be cooled by vaporizing the fuel in the cylinder. Therefore, the output and the fuel efficiency of the four-stroke engine can be improved. Additionally, the fuel injection valve is disposed on the exhaust port side, and therefore the flow of a fuel mist in the cylinder can be prevented from being blocked by intake air that has flowed into the combustion chamber from the intake port. Additionally, the fuel injection valve is not disposed near the intake port, and therefore the degree of freedom of the shape of the intake port and the degree of freedom of the layout can be improved. Therefore, the amount of air with which the cylinder is filled can be increased by decreasing the fluid resistance of the intake port. As a result, the output of the four-stroke engine can be increased.

The four-stroke engine may be a straight-type engine including a plurality of cylinders arranged linearly, or may be a V-type engine including a plurality of cylinders arranged along a V-shaped line. If the four-stroke engine is a V-type engine, the fuel injection valve may be disposed inside the V-shaped line, or may be disposed outside the V-shaped line.

Additionally, the cylinder head may define a water jacket located between the exhaust port and the fuel injection valve. In this case, the four-stroke engine may be arranged so that water from outside is supplied to the water jacket.

One preferred embodiment of the present invention provides an outboard motor including the four-stroke engine and a water pump that supplies water outside the outboard motor to the water jacket by being driven by the four-stroke engine.

According to this arrangement, the four-stroke engine drives the water pump, and, as a result, water from the outside, i.e., water outside the outboard motor is supplied to the water jacket disposed in the four-stroke engine as cooling water. Water outside the outboard motor is hardly influenced by the operational state of the engine and that of the outboard motor, and therefore cooling water having a substantially constant temperature is supplied to the water jacket. Therefore, the exhaust port, the fuel injection valve itself, and the surrounding areas of these components can be kept at a low temperature regardless of the operational state of the engine and that of the outboard motor. Therefore, soot can be prevented from being generated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
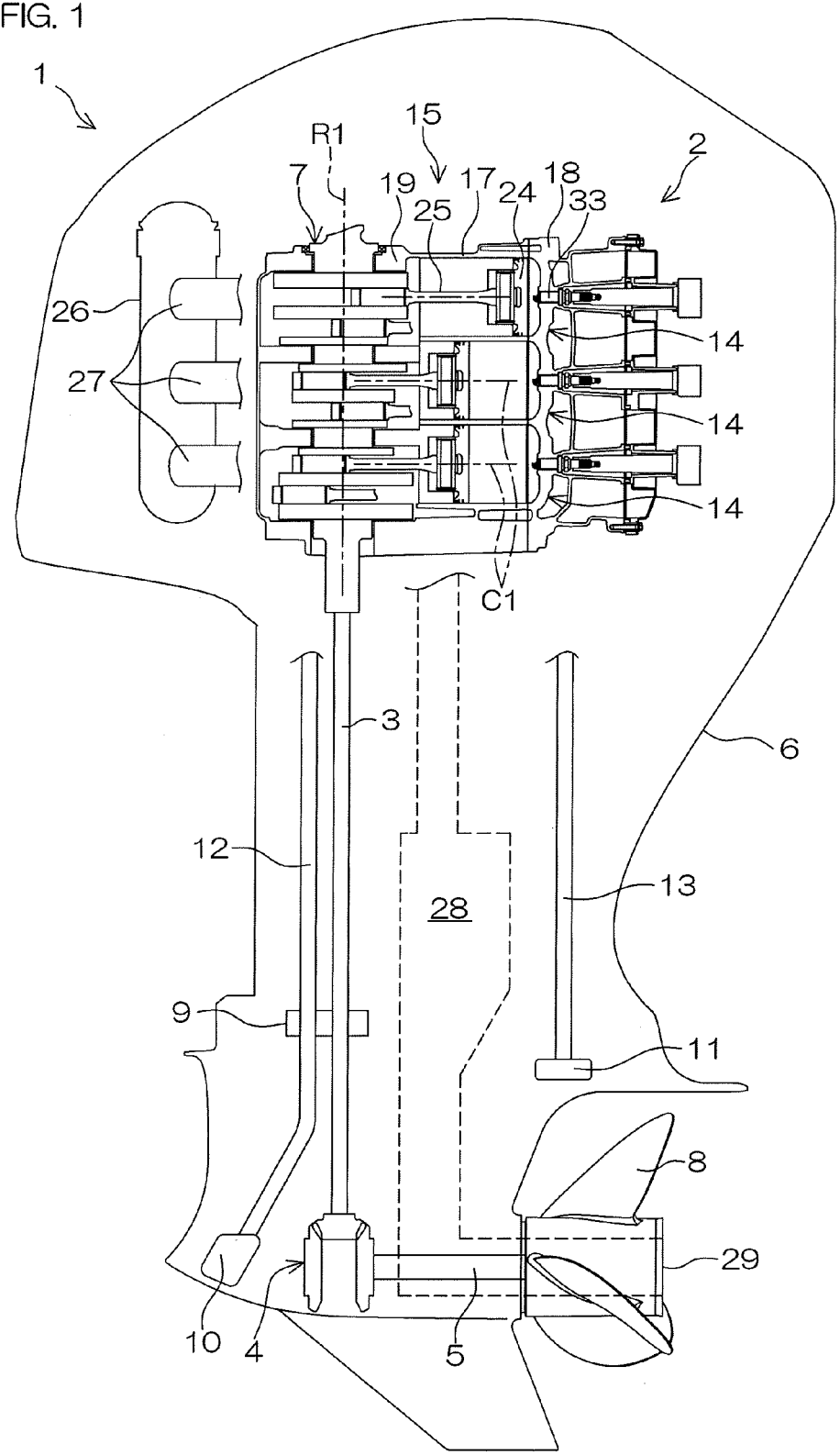
FIG. 1 is a schematic sectional view of an outboard motor according to a first preferred embodiment of the present invention, which is cut by a vertical plane.

FIG. 1 is a schematic sectional view of an outboard motor 1 according to a first preferred embodiment of the present invention, which is cut by a vertical plane.

An outboard motor 1 includes an engine 2, a drive shaft 3, a gear mechanism 4, a propeller shaft 5, and a casing 6 that contains these components 2 to 5. The engine 2 includes a crankshaft 7 rotatable around a rotational axis R1 that extends in an up-down direction. The drive shaft 3 extends downwardly from the engine 2. An upper end of the drive shaft 3 is connected to the crankshaft 7. A lower end of the drive shaft 3 is connected to a front end of the propeller shaft 5 through the gear mechanism 4. The propeller shaft 5 extends in a front-rear direction in the casing 6. A rear end of the propeller shaft 5 protrudes rearwardly from the casing 6. A propeller 8 is connected to the rear end of the propeller shaft 5. When the drive shaft 3 is rotationally driven by the engine 2, the rotation of the drive shaft 3 is transmitted to the propeller shaft 5 through the gear mechanism 4. As a result, the propeller 8 rotates together with the propeller shaft 5, and a thrust force to propel a vessel is generated.

The outboard motor 1 includes a water pump 9 that supplies cooling water to the engine 2. The outboard motor 1 additionally includes a water intake 10 and a water outlet 11 that are opened in the outer surface of the outboard motor 1 (i.e., in the outer surface of the casing 6) and a cooling-water supply passage 12 and a cooling-water exhaust passage 13 that are provided in the outboard motor 1. The water intake 10 is connected to the engine 2 via the cooling-water supply passage 12. The water outlet 11 is connected to the engine 2 via the cooling-water exhaust passage 13. When the water pump 9 is driven by the engine 2, water outside the outboard motor 1 is sucked into the water intake 10. The water sucked thereinto is passed through the cooling-water supply passage 12, the engine 2, and the cooling-water exhaust passage 13, and is then discharged from the water outlet 11.

In detail, the water pump 9 includes an impeller that is connected to the drive shaft 3 and that rotates together with the drive shaft 3. Therefore, when the engine 2 rotates the drive shaft 3, a sucking force is generated by the rotation of the impeller, and water outside the outboard motor 1 is sucked into the water intake 10 by the sucking force. Water sucked into the water intake 10 is supplied to the engine 2 through the cooling-water supply passage 12. Water supplied to the engine 2 is passed through a water jacket 23 (see FIG. 3) provided in the engine 2, and is then discharged to the cooling-water exhaust passage 13. Water discharged to the cooling-water exhaust passage 13 is discharged from the water outlet 11 to the outside of the outboard motor 1. The engine 2 is arranged so that water from outside the engine 2 (in more detail, from outside the outboard motor 1) is supplied in this way.

Figure 2:
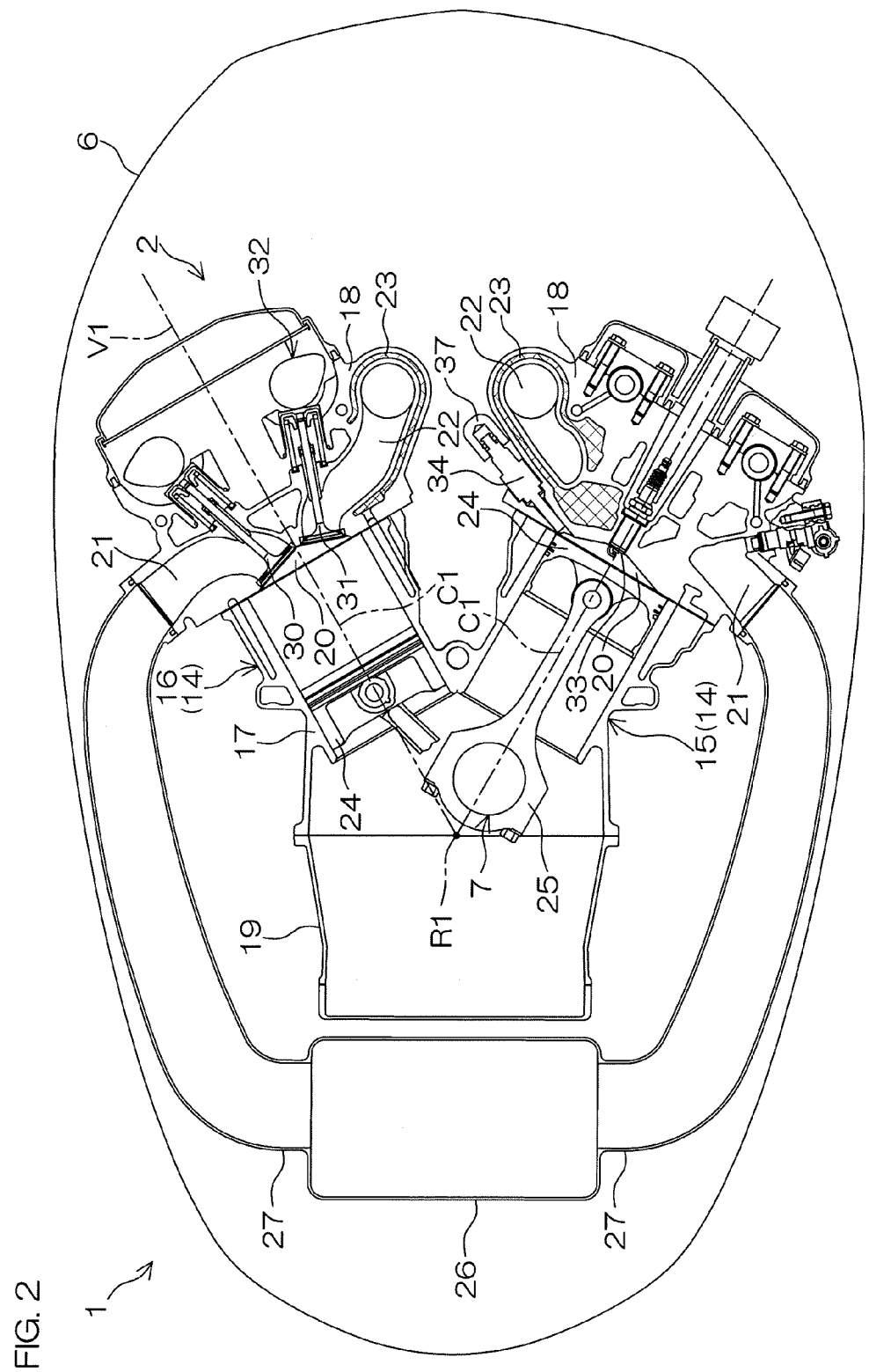
FIG. 2 is a sectional view of the outboard motor according to the first preferred embodiment of the present invention, which is cut by a horizontal plane.

FIG. 2 is a sectional view of the outboard motor 1 according to the first preferred embodiment of the present invention, which is cut by a horizontal plane. In the following description, the up-down direction of the engine 2 is a direction in which the rotational axis R1 of the crankshaft 7 extends, whereas the front-rear direction of the engine 2 is a direction along a line (bisector) by which an area inside a V-shaped line V1 (see FIG. 2) is halved when viewed in a planar manner.

As shown in FIG. 2, the engine 2 is, for example, a V-type four-stroke engine (internal combustion engine). Therefore, the engine 2 includes a plurality of cylinders 14 arranged along the V-shaped line V1. In the first preferred embodiment, the engine 2 includes, for example, six cylinders 14.

Three cylinders 14 of the six cylinders 14 are preferably arranged to define one row 15 arranged in the up-down direction, and the remaining three cylinders 14 are preferably arranged to define the other row 16 arranged in the up-down direction. As shown in FIG. 2, the one row 15 and the other row 16 are arranged like the capital letter V when viewed in a planar manner. Additionally, the one row 15 and the other row 16 coincide with each other when viewed laterally. An upper end of the one row 15 is disposed higher than that of the other row 16.

As shown in FIG. 2, the engine 2 includes a cylinder body 17, two cylinder heads 18, and a crankcase 19. The cylinder body 17 is shaped to be opened rearwardly like the capital letter V when viewed in a planar manner, and defines a V bank. As a result, the cylinder body 17 includes two rear ends.

The two cylinder heads 18 are respectively connected to the two rear ends of the cylinder body 17, and the crankcase 19 is connected to a front end of the cylinder body 17. The cylinder body 17 and the cylinder heads 18 define a plurality of cylinders 14. Each cylinder 14 has a central axis C1 that extends in a horizontal direction. The central axis C1 of each cylinder 14 is disposed on the V-shaped line V1. In other words, the V-shaped line V1 is defined by a vertical plane including the central axis C1 of each of the cylinders 14 that define the one row 15 and by a vertical plane including the central axis C1 of each of the cylinders 14 that define the other row 16.

As shown in FIG. 2, the cylinder head 18 defines a combustion chamber 20 in which an air-fuel mixture is burnt, an intake port 21 that communicates with the combustion chamber 20, and an exhaust port 22 that communicates with the combustion chamber 20. The cylinder head 18 further defines a water jacket 23 (which is a crosshatched portion in FIG. 2) through which cooling water flows. The water jacket 23 surrounds the exhaust port 22. A portion of the water jacket 23 is disposed between the outer surface of the cylinder head 18 and the exhaust port 22. Therefore, the outer surface of the cylinder head 18 is prevented from becoming high in temperature. Additionally, a portion of the water jacket 23 is disposed between the exhaust port 22 and a fuel injection valve 34 described later. Therefore, the temperature of the fuel injection valve 34 is prevented from being raised by heat transmitted from the exhaust port 22.

As shown in FIG. 2, the engine 2 additionally includes a plurality of pistons 24 and a plurality of connecting rods 25 by which the pistons 24 and the crankshaft 7 are connected together. The engine 2 still additionally includes an intake surge tank 26 disposed in front of the crankcase 19 and a plurality of intake pipes 27 connected to the intake surge tank 26. The intake pipes 27 are disposed outside the cylinder body 17, the cylinder head 18, and the crankcase 19. In detail, the intake pipes 27 are connected to the cylinder head 18 outside the V-shaped line V1, and extend forwardly from the cylinder head 18. A front end of each intake pipe 27 is connected to the intake surge tank 26.

As shown in FIG. 2, the intake port 21 is disposed outside the V-shaped line V1. The intake port 21 extends from a side portion of the cylinder head 18 to the combustion chamber 20. The intake port 21 passes through the outside of the cylinder head 18 and the combustion chamber 20. The inside of the intake pipe 27 communicates with the intake port 21. Therefore, intake air supplied to the intake surge tank 26 is supplied to the intake port 21 through the intake pipe 27. On the other hand, exhaust gas generated in the combustion chamber 20 is discharged outwardly from the engine 2 through the exhaust port 22. In detail, exhaust gas generated in the combustion chamber 20 is discharged through the exhaust port 22 toward a main exhaust passage 28 (see FIG. 1) provided in the outboard motor 1. As shown in FIG. 1, the main exhaust passage 28 defines an exhaust outlet 29 that is opened at the propeller 8. Therefore, exhaust gas discharged to the main exhaust passage 28 is discharged into water.

Figure 3:
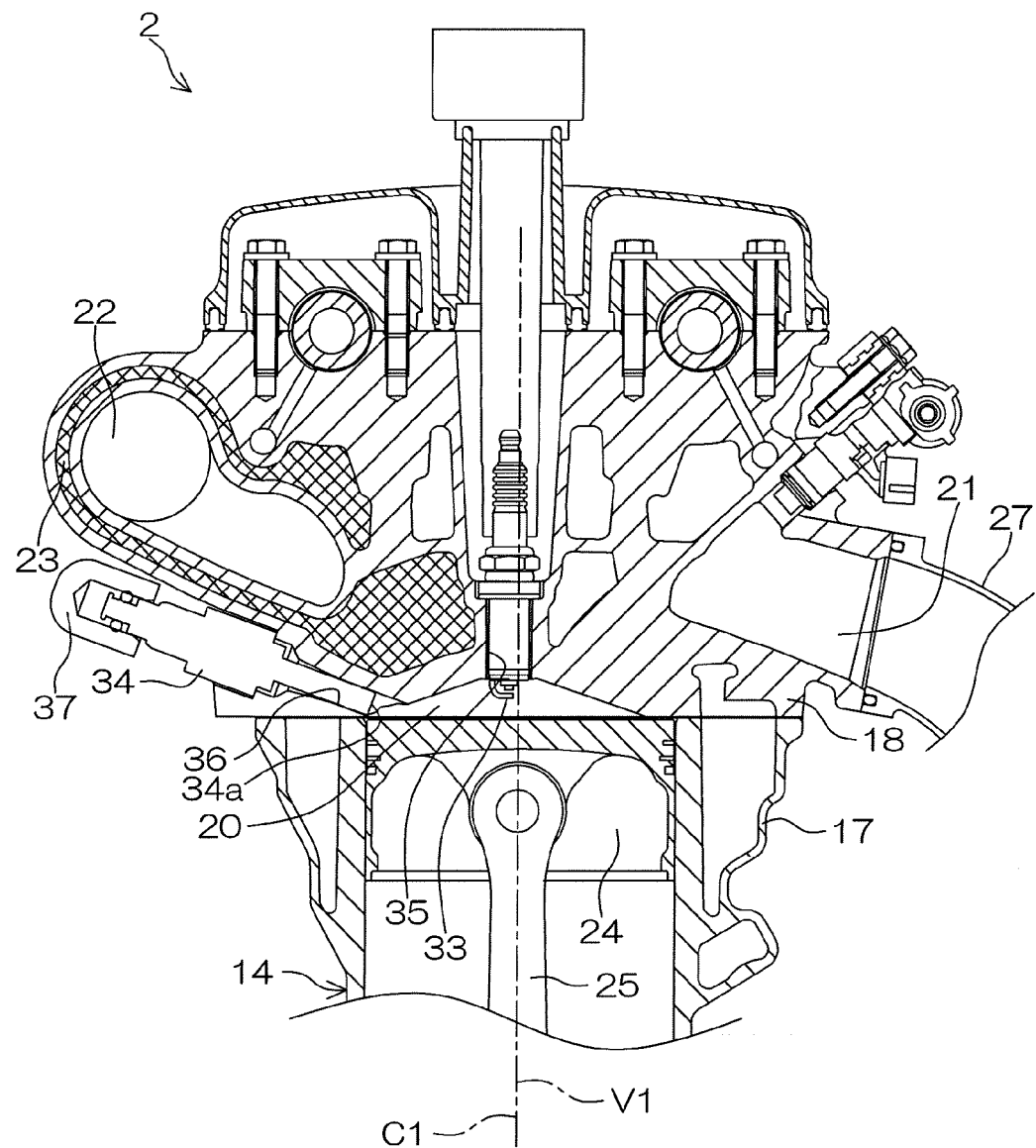
FIG. 3 is an enlarged view of a portion of FIG. 2.
Figure 4:
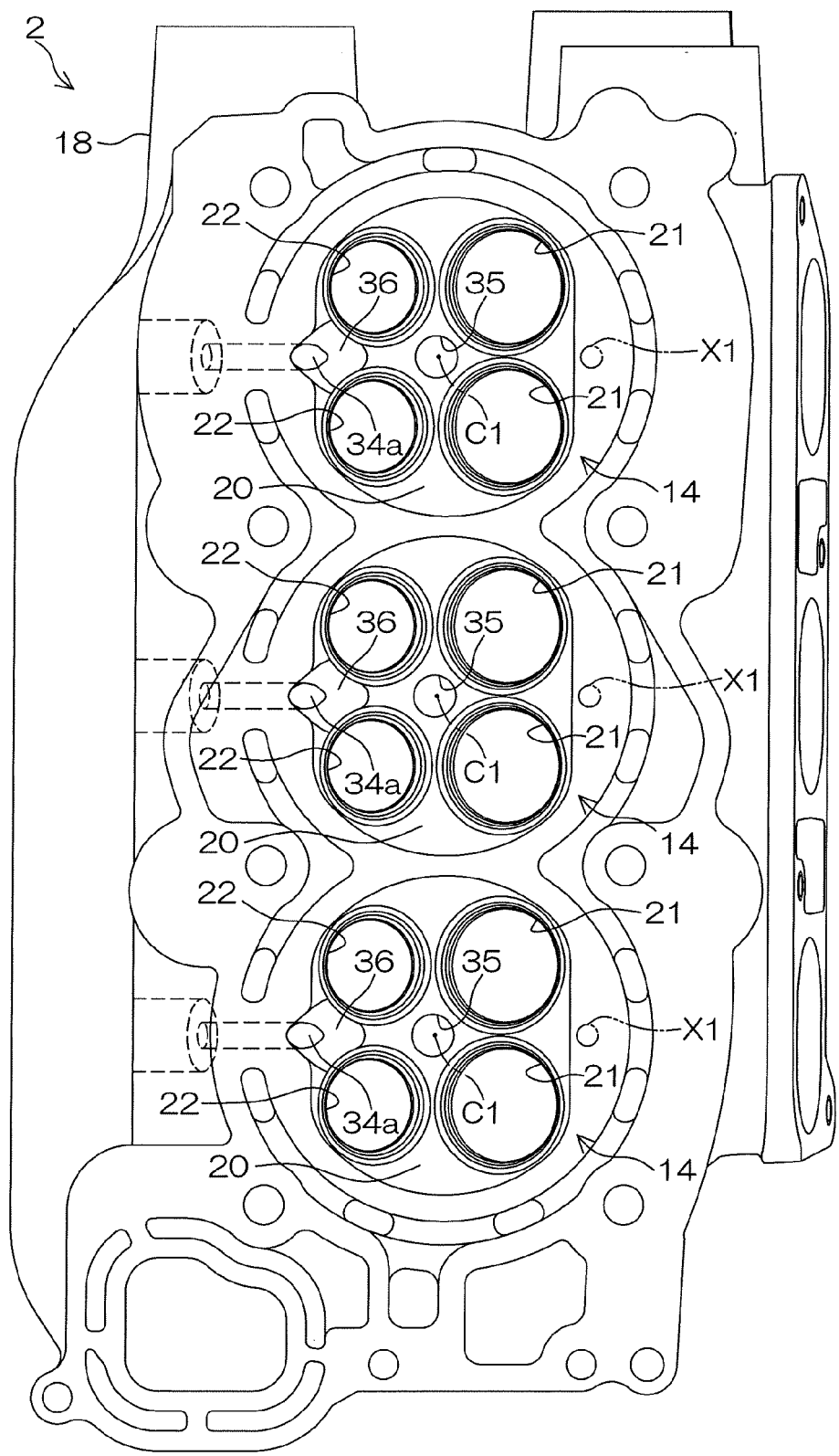
FIG. 4 is a view of a cylinder head according to the first preferred embodiment of the present invention, which is viewed from the combustion chamber side.

FIG. 3 is an enlarged view of a portion of FIG. 2, showing a cross section of a portion of the engine 2. FIG. 4 is a view of the cylinder head 18 according to the first preferred embodiment of the present invention, which is viewed from the combustion chamber 20 side. Hereinafter, reference is made to FIG. 2 to FIG. 4.

As shown in FIG. 2, the engine 2 includes a plurality of intake valves 30, a plurality of exhaust valves 31, and a valve driving mechanism 32 that drives the intake valves 30 and the exhaust valves 31. For example, two intake valves 30 and two exhaust valves 31 are provided for each cylinder 14. Therefore, likewise, two intake ports 21 and two exhaust ports 22 are provided for each cylinder 14 as shown in FIG. 4. The intake ports 21 and the exhaust ports 22 are opened at the combustion chamber 20. As shown in FIG. 2, an opening of the intake port 21 and an opening of the exhaust port 22 are disposed on mutually opposite sides with the central axis C1 of the cylinder 14 therebetween. The intake port 21 and the exhaust port 22 are opened and closed by the intake valve 30 and the exhaust valve 31, respectively.

As shown in FIG. 3, the engine 2 still additionally includes a spark plug 33 that burns an air-fuel mixture in the combustion chamber 20 and a fuel injection valve 34 that injects fuel (e.g., gasoline) into the combustion chamber 20. The spark plug 33 is contained in a plug containing hole 35 defined by the cylinder head 18, and the fuel injection valve 34 is contained in a fuel-injection-valve containing hole 36 defined by the cylinder head 18. The plug containing hole 35 extends along the central axis C1 of the cylinder 14. The fuel-injection-valve containing hole 36 extends in the horizontal direction that inclines with respect to the central axis C1 of the cylinder 14. Therefore, the spark plug 33 extends along the central axis C1 of the cylinder 14, and the fuel injection valve 34 inclines with respect to the central axis C1 of the cylinder 14.

As shown in FIG. 3, the plug containing hole 35 and the fuel-injection-valve containing hole 36 are opened at the combustion chamber 20. An opening of the plug containing hole 35 is disposed on the central axis C1 of the cylinder 14. On the other hand, an opening of the fuel-injection-valve containing hole 36 is disposed outside the opening of the plug containing hole 35 (in a direction away from the central axis C1 of the cylinder 14), and is disposed closer to the cylinder body 17 than to the opening of the plug containing hole 35. A front end of the spark plug 33 that emits sparks passes through the opening of the plug containing hole 35, and reaches the combustion chamber 20. On the other hand, a front end 34a of the fuel injection valve 34 having an injection opening through which a fuel mist is injected is disposed in the fuel-injection-valve containing hole 36. Therefore, the front end 34a of the fuel injection valve 34 faces the combustion chamber 20 through the opening of the fuel-injection-valve containing hole 36. The front end 34a of the fuel injection valve 34 may reach the combustion chamber 20.

As shown in FIG. 3, the fuel injection valve 34 is held by the cylinder head 18 at a position closer to the cylinder body 17 than the exhaust port 22. The cylinder body 17 is disposed on the side opposite to the exhaust port 22 with respect to the combustion chamber 20. The fuel injection valve 34 is held by the cylinder head 18 between the exhaust port 22 and the cylinder body 17. As shown in FIG. 2, the fuel injection valve 34 is disposed inside the V-shaped line V1. An end of a fuel supply pipe 37 that supplies fuel to the fuel injection valve 34 is connected to the fuel injection valve 34 inside the V-shaped line V1. The fuel injection valve 34 injects (i.e., sprays) fuel supplied from the fuel supply pipe 37 into the combustion chamber 20. A fuel mist jetted from the front end 34a of the fuel injection valve 34 is supplied to the combustion chamber 20 through the opening of the fuel-injection-valve containing hole 36. As a result, the fuel mist is supplied directly to the combustion chamber 20.

As shown in FIG. 4, when the cylinder head 18 is viewed from the combustion chamber 20 side, openings of four ports corresponding to the same cylinder 14 (i.e., openings of the two intake ports 21 and openings of the two exhaust ports 22) are arranged in a grid configuration. In other words, openings of four ports corresponding to one cylinder 14 are respectively disposed at four vertexes of a tetragon that surrounds the central axis C1 of the cylinder 14. Therefore, the opening of the plug containing hole 35 is disposed inside the tetragon, and is surrounded by the openings of the four ports. Furthermore, when the cylinder head 18 is viewed from the combustion chamber 20 side, a portion of the opening of the fuel-injection-valve containing hole 36 is disposed between openings of the two exhaust ports 22. The remaining portion of the fuel-injection-valve containing hole 36 is disposed outside the openings of the two exhaust ports 22 (in the direction away from the central axis C1 of the cylinder 14).

Figure 5:
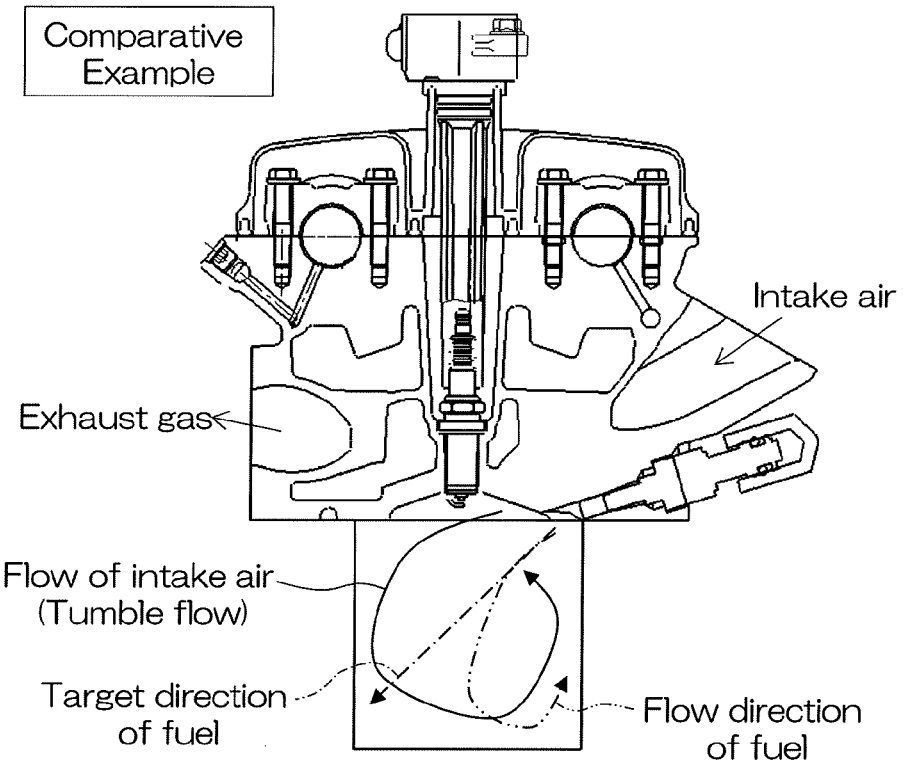
FIG. 5 is a schematic view for describing a fluid flow in a cylinder according to a comparative example.
Figure 6:
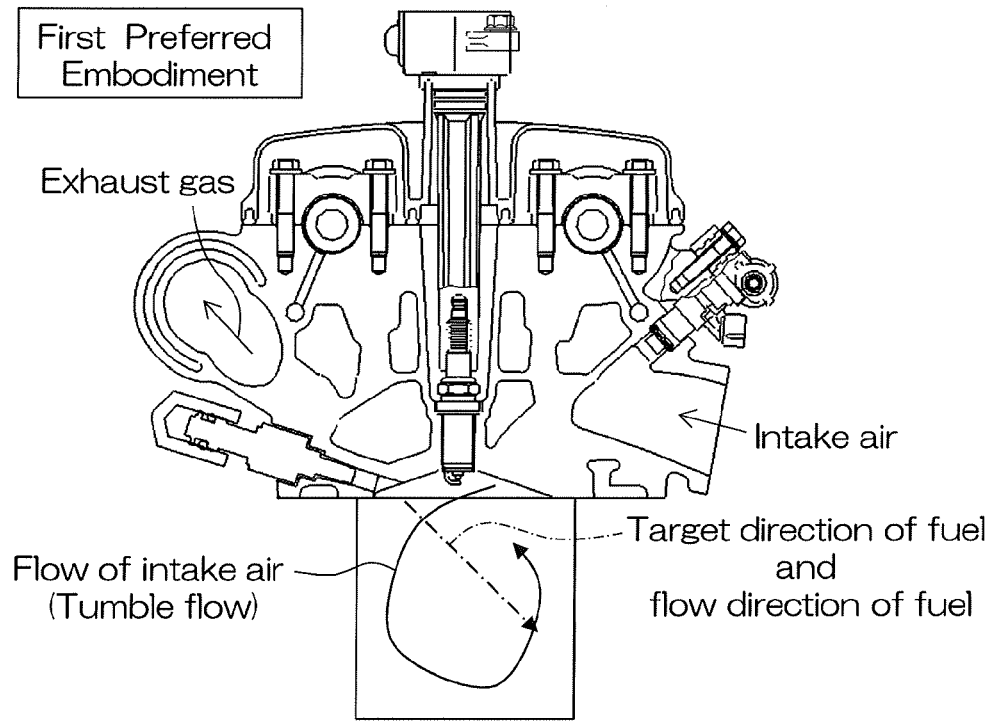
FIG. 6 is a schematic view for describing a fluid flow in the cylinder according to the first preferred embodiment of the present invention.
Figure 7:
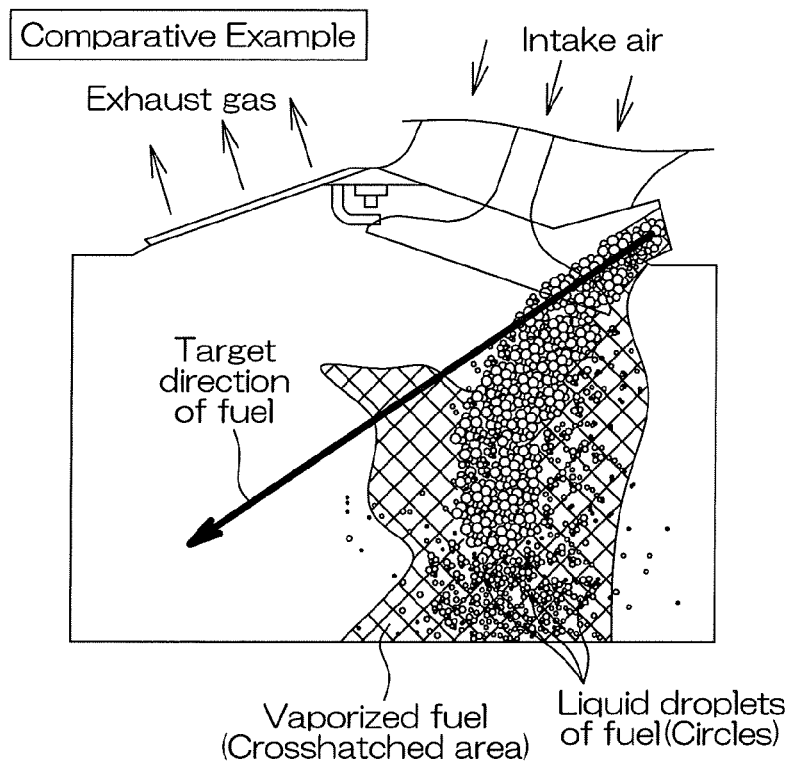
FIG. 7 is a view showing a simulation result of the fluid flow in the cylinder according to the comparative example.
Figure 8:
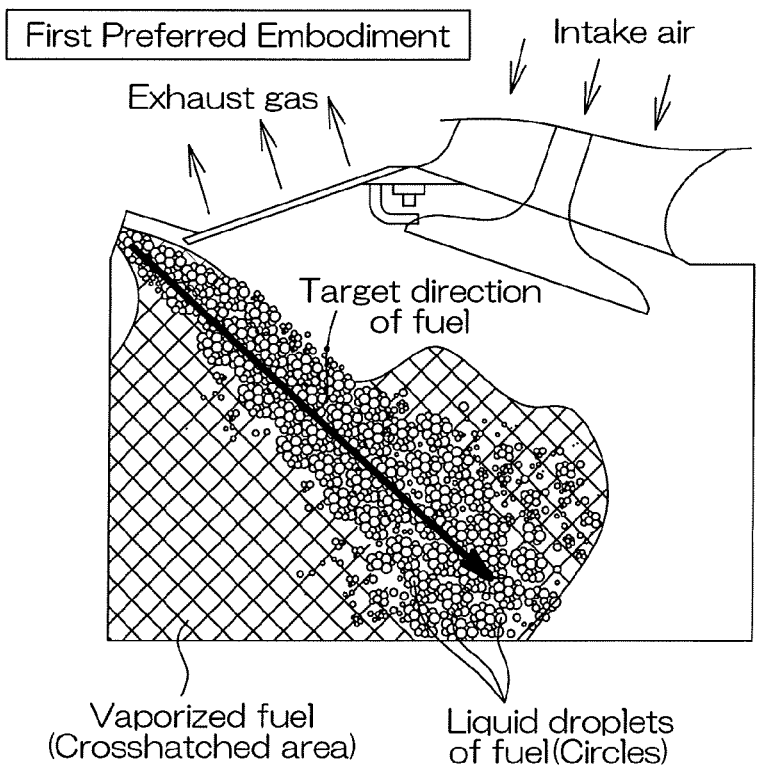
FIG. 8 is a view showing a simulation result of the fluid flow in the cylinder according to the first preferred embodiment of the present invention.

FIG. 5 is a schematic view for describing a fluid flow in a cylinder according to a comparative example. FIG. 6 is a schematic view for describing a fluid flow in the cylinder according to the first preferred embodiment of the present invention. FIG. 7 is a view showing a simulation result of the fluid flow in the cylinder according to the comparative example. FIG. 8 is a view showing a simulation result of the fluid flow in the cylinder according to the first preferred embodiment.

FIG. 7 and FIG. 8 each show a condition of the inside of the cylinder at the same timing. In a four-stroke engine, four steps (i.e., intake step, compression step, explosion step, and exhaust step) are performed, and, as a result, a crankshaft undergoes a change of 720 degrees in its rotation angle. FIG. 7 and FIG. 8 each show a condition of the inside of the cylinder at the same rotation angle. Hereinafter, reference is made to FIG. 4 to FIG. 8.

A main difference between the first preferred embodiment and the comparative example is the disposition of the fuel injection valve. In other words, as is understood from a comparison between FIG. 5 and FIG. 6, the fuel injection valve is disposed near the exhaust port in the first preferred embodiment, whereas the fuel injection valve is disposed near the intake port in the comparative example. Therefore, in the comparative example, a fuel mist is injected into the combustion chamber from near the intake port.

When the intake port is opened by driving the intake valve, intake air supplied to the intake port is injected into the combustion chamber from a gap between the intake valve and the inner wall surface of the intake port. As a result, the intake air is supplied to the combustion chamber. In either of the first preferred embodiment and the comparative example, the engine is arranged such that a tumble flow (see FIG. 5 and FIG. 6) is created by intake air injected into the combustion chamber from the intake port. In other words, when intake air is injected into the combustion chamber from the intake port, a tumble flow that rotates around an axis perpendicular to the central axis of the cylinder is created in the cylinder.

On the other hand, in either of the first preferred embodiment and the comparative example, the fuel injection valve is arranged such that a fuel mist, i.e., liquid fuel is jetted in a predetermined target direction (see FIG. 5 to FIG. 8) so that the fuel evenly spreads in the cylinder. The target direction is, for example, a direction that is aimed from the front end of the fuel injection valve toward the central axis of the cylinder and that is inclined with respect to the central axis of the cylinder.

As shown in FIG. 4, in the first preferred embodiment, the front end 34a of the fuel injection valve 34 is disposed on the side opposite to the intake port 21 with respect to the central axis C1 of the cylinder 14. On the other hand, as shown by the alternate long and two short dashed lines in FIG. 4, in the comparative example, the front end X1 of the fuel injection valve is disposed on the side opposite to the exhaust port 22 with respect to the central axis C1 of the cylinder 14. Therefore, in the first preferred embodiment, the distance from the intake port to the fuel injection valve is longer than in the comparative example.

In either of the first preferred embodiment and the comparative example, the fuel injection valve injects a fuel mist into the combustion chamber at a timing at which intake air is injected into the combustion chamber from the intake port. Therefore, the intake air collides with the fuel in the cylinder. Therefore, the fuel flows toward an environment differing from a static environment in which there is no airflow in the cylinder. Therefore, in either of the first preferred embodiment and the comparative example, the direction in which the fuel flows is influenced by a tumble flow. However, as described below, the flow of fuel is more greatly influenced by the flow of intake air in the comparative example than in the first preferred embodiment.

In detail, in the comparative example, the distance from the intake port to the fuel injection valve is short, and therefore fuel jetted from the fuel injection valve collides with intake air having a high flow velocity. Therefore, as shown in FIG. 5, the flow direction of fuel is greatly changed by a tumble flow, and the fuel is caused to flow in a direction differing from a target direction (see the arrow shown by the alternate long and two short dashed lines in FIG. 5). Therefore, disproportion is liable to occur in the spread of the fuel in the cylinder, and the fuel easily becomes uneven in its spread in the cylinder. In detail, as shown in FIG. 7, the spread of liquid droplets of fuel and the spread of vaporized fuel are small, and most of the fuel does not reach the side (i.e., exhaust port side) opposite to the fuel injection valve. Therefore, there is a case in which the fuel has not evenly diffused when the spark plug generates sparks.

On the other hand, in the first preferred embodiment, the distance from the intake port to the fuel injection valve is long, and therefore fuel jetted from the fuel injection valve does not easily collide with intake air having a high flow velocity. Therefore, as shown in FIG. 6 and FIG. 8, fuel jetted from the fuel injection valve flows in a target direction or flows substantially in the same direction as the target direction. Therefore, fuel can be evenly supplied into the cylinder even if a compulsory flow that diffuses the fuel is not created. In detail, as is understood from a comparison between FIG. 7 and FIG. 8, the spread of liquid droplets of fuel and the spread of vaporized fuel are greater in the first preferred embodiment than in the comparative example. Additionally, in the first preferred embodiment, the fuel more easily reaches the side opposite to the fuel injection valve than in the comparative example. Therefore, in the first preferred embodiment, a uniform gaseous mixture (i.e., air-fuel mixture) can be created.

As described above, in the first preferred embodiment, the fuel injection valve 34 is held by the cylinder head 18 on the side ranging from the exhaust port 22 to the cylinder body 17. In other words, the fuel injection valve 34 is disposed between the exhaust port 22 and the cylinder body 17. Therefore, the distance from the exhaust port 22 to the front end 34a of the fuel injection valve 34 is shorter than the distance from the intake port 21 to the front end 34a of the fuel injection valve 34. In other words, the fuel injection valve 34 is disposed on the exhaust port 22 side.

A fuel mist jetted from the fuel injection valve 34 is supplied directly to the combustion chamber 20, and therefore the inside of the cylinder 14 can be cooled by vaporizing the fuel in the cylinder 14. Therefore, the output and the fuel efficiency of the engine 2 can be improved. Additionally, the fuel injection valve 34 is disposed on the exhaust port 22 side, and therefore the flow of a fuel mist in the cylinder 14 can be prevented from being blocked by intake air that has flowed into the combustion chamber 20 from the intake port 21. Additionally, the fuel injection valve 34 is not disposed near the intake port 21, and therefore the degree of freedom of the shape of the intake port 21 and that of the layout can be improved. As a result, the amount of air with which the cylinder 14 is filled can be increased by decreasing the fluid resistance of the intake port 21. As a result, the output of the engine 2 can be increased.

Additionally, in the first preferred embodiment, the water jacket 23 is preferably defined by the cylinder head 18, and a portion of the water jacket 23 is disposed between the exhaust port 22 and the fuel injection valve 34. The exhaust port 22 is cooled by cooling water supplied to the water jacket 23. Therefore, the amount of heat transmitted from the exhaust port 22 to the fuel injection valve 34 can be decreased. Therefore, the fuel injection valve 34 can be prevented from becoming high in temperature. As a result, the front end 34a of the fuel injection valve 34 can be prevented from being choked up with soot.

In more detail, soot is easily generated in a high-fuel-concentration and high-temperature atmosphere. The injection opening through which a fuel mist is injected is defined at the front end 34a of the fuel injection valve 34, and therefore the fuel concentration is high in the neighborhood of the front end 34a of the fuel injection valve 34. Therefore, soot will be easily generated if the temperature is high in the neighborhood of the front end 34a of the fuel injection valve 34. However, in the first preferred embodiment, the fuel injection valve 34 is prevented from becoming high in temperature, and therefore the temperature is low in the neighborhood of the front end 34a of the fuel injection valve 34. Therefore, soot can be prevented from being generated. Additionally, the exhaust port 22 is covered with the water jacket 23, and therefore, even if fuel leaks from the fuel injection valve 34 or from the fuel supply pipe 37, the fuel that has leaked therefrom can be prevented from coming into contact with a high-temperature wall surface.

Additionally, in the first preferred embodiment, water from the outside is supplied to the water jacket 23. Therefore, cooling water that has a substantially constant temperature is supplied to the water jacket 23 regardless of the operational state of the engine 2. In other words, in a cooling device, such as the one that is mounted in a vehicle, in which cooling water is circulated, there is a case in which the cooling water supplied to a water jacket will become high in temperature if the amount of heat generated in an engine increases. On the other hand, the water temperature of the outside, i.e., the water temperature of a lake or of the sea is hardly influenced by the operational state of the engine 2, and therefore cooling water having a substantially constant temperature is supplied to the water jacket 23. Therefore, the cylinder head 18 can be kept at a low temperature regardless of the operational state of the engine 2. Therefore, the neighborhood of the exhaust port 22 can be kept at a low temperature regardless of the operational state of the engine 2. Therefore, soot can be prevented from being generated.

Second Preferred Embodiment

Figure 9:
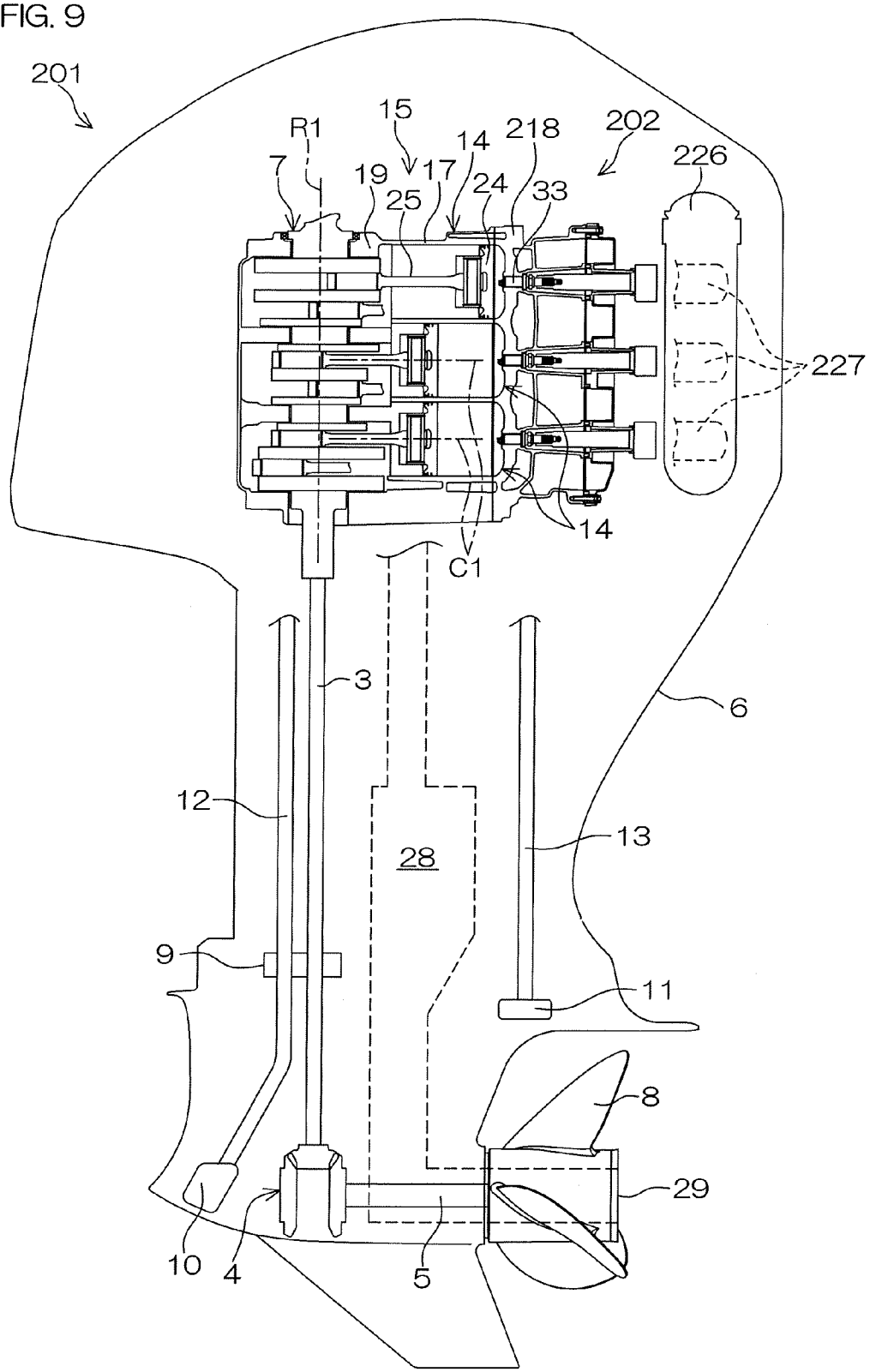
FIG. 9 is a schematic sectional view of an outboard motor according to a second preferred embodiment of the present invention, which is cut by a vertical plane.
Figure 10:
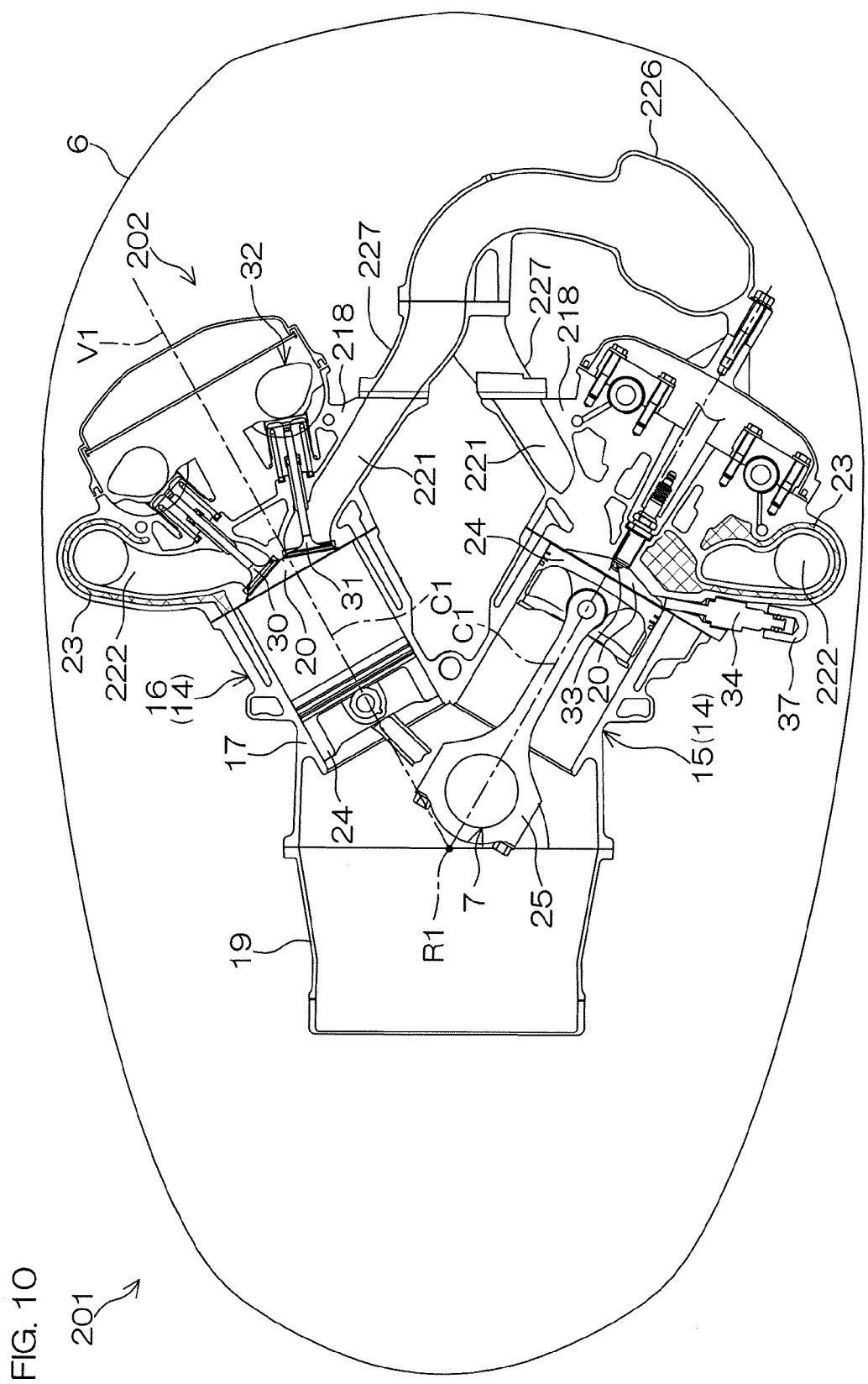
FIG. 10 is a sectional view of the outboard motor according to the second preferred embodiment of the present invention, which is cut by a horizontal plane.

Next, a second preferred embodiment of the present invention will be described. A main difference between the second preferred embodiment and the first preferred embodiment mentioned above is the disposition of the intake port and the exhaust port. In detail, the intake port is preferably disposed outside the V-shaped line in the first preferred embodiment, whereas the intake port is preferably disposed inside the V-shaped line in the second preferred embodiment. In FIG. 9 to FIG. 10 showing the arrangement of the second preferred embodiment, the same reference characters as in FIG. 1 and in the other figures are respectively given to components corresponding to those of FIG. 1 to FIG. 8, and a description of these components is omitted.

FIG. 9 is a schematic sectional view of an outboard motor 201 according to the second preferred embodiment of the present invention, which is cut by a vertical plane. FIG. 10 is a sectional view of the outboard motor 201 according to the second preferred embodiment of the present invention, which is cut by a horizontal plane.

The outboard motor 201 according to the second preferred embodiment has a similar arrangement to the outboard motor 1 according to the first preferred embodiment. That is, the outboard motor 201 preferably includes an engine 202 instead of the engine 2 according to the first preferred embodiment. The engine 202 has a similar arrangement to the engine 2 according to the first preferred embodiment. Specifically, as shown in FIG. 10, the engine 202 is, for example, a V-type four-stroke engine (internal combustion engine) including a plurality of cylinders 14 arranged along a V-shaped line V1.

As shown in FIG. 10, the engine 202 includes two cylinder heads 218, a plurality of intake pipes 227 connected to the cylinder heads 218, and an intake surge tank 226 connected to the plurality of intake pipes 227. The cylinder head 218 defines a combustion chamber 20, an intake port 221 that communicates with the combustion chamber 20, and an exhaust port 222 that communicates with the combustion chamber 20. The intake port 221 is disposed inside the V-shaped line V1. Therefore, the exhaust port 222 and the fuel injection valve 34 are disposed outside the V-shaped line V1. The intake surge tank 226 and the intake pipes 227 are disposed behind the cylinder heads 218. The intake surge tank 226 and the intake pipes 227 are disposed inside the V-shaped line V1.

As described above, in the second preferred embodiment, the intake surge tank 226 and the intake pipes 227 are disposed inside the V-shaped line V1. Therefore, the width of the engine 202 (i.e., the length in the right-left direction) is smaller than in the first preferred embodiment. Therefore, the engine 202 and the outboard motor 201 can be reduced in size. Additionally, in the second preferred embodiment, the fuel injection valve 34 is disposed outside the V-shaped line V1. Therefore, the fuel injection valve 34 can be attached to the cylinder head 218 from outside the cylinder head 218. Therefore, the fuel injection valve 34 can be more easily attached to the cylinder head 218 than in a case in which the fuel injection valve 34 is disposed inside the V-shaped line V1. Additionally, in the second preferred embodiment, the fuel injection valve 34 is disposed on the exhaust port 222 side, and therefore a uniform gaseous mixture can be created in the same way as in the first preferred embodiment.

Although the preferred embodiments of the present invention have been described as above, the present invention is not limited to the contents of the first and second preferred embodiments, and can be variously modified within the scope of the appended claims.

For example, as described above, in the first and second preferred embodiments, the engines 2 and 202 are preferably mounted in the outboard motors 1 and 201, respectively. However, the engines 2 and 202 may be mounted in machines other than the outboard motors 1 and 201.

Additionally, as described above, in the first and second preferred embodiments, the engines 2 and 202 preferably are V-type engines. However, each of the engines 2 and 202 may be a straight-type engine including a plurality of cylinders arranged linearly.

Additionally, as described above, in the first preferred embodiment, two intake ports 21 and two exhaust ports 22 are preferably provided for each cylinder 14. Likewise, as described above, in the second preferred embodiment, two intake ports 221 and two exhaust ports 222 are provided for each cylinder 14. However, the number of the intake ports 21 or 221 for the same cylinder 14 may be one. The same applies to the exhaust ports 22 or 222.

Non-limiting examples of correspondence relationships between the components recited in the appended claims and the components described in the above preferred embodiments are shown below.

Combustion chamber: Combustion chamber 20
    Intake port: Intake port 21, 221
    Exhaust port: Exhaust port 22, 222
    Cylinder head: Cylinder head 18, 218
    Cylinder body: Cylinder body 17
    Fuel injection valve: Fuel injection valve 34
    Four-stroke engine: Engine 2, 202
    V-shaped line: V-shaped line V1
    Cylinder: Cylinder 14
    Water jacket: Water jacket 23
    Water pump: Water pump 9
    Outboard motor: Outboard motor 1, 201

The present application corresponds to Japanese Patent Application No. 2011-116253 filed in the Japan Patent Office on May 24, 2011, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A four-stroke engine comprising:
a cylinder head including a combustion chamber, an intake port that communicates with the combustion chamber, and an exhaust port that communicates with the combustion chamber;
a spark plug that burns an air-fuel mixture in the combustion chamber;
a cylinder body connected to the cylinder head; and
a fuel injection valve held by the cylinder head at a position closer to the cylinder body than a position of the exhaust port and which supplies a fuel mist directly to the combustion chamber by jetting the fuel mist toward the combustion chamber; wherein
the fuel injection valve is arranged below the exhaust port and above the combustion chamber;
a distance from the exhaust port to the fuel injection valve is shorter than a distance from the intake port to the fuel injection valve; and
the fuel injection valve is angled downward.

2. The four-stroke engine according to claim 1, wherein the four-stroke engine is a V-type engine including a plurality of cylinders arranged along a V-shaped line, and the fuel injection valve is disposed inside the V-shaped line.

3. The four-stroke engine according to claim 1, wherein the four-stroke engine is a V-type engine including a plurality of cylinders arranged along a V-shaped line, and the fuel injection valve is disposed outside the V-shaped line.

4. The four-stroke engine according to claim 1, wherein the cylinder head includes a water jacket located between the exhaust port and the fuel injection valve.

5. The four-stroke engine according to claim 4, wherein water from outside the four-stroke engine is supplied to the water jacket.

6. An outboard motor comprising:
the four-stroke engine according to claim 5; and
a water pump that supplies water outside the outboard motor to the water jacket by being driven by the four-stroke engine.

7. A four-stroke engine comprising:
a cylinder head including a combustion chamber, an intake port that communicates with the combustion chamber, and an exhaust port that communicates with the combustion chamber;
a cylinder body connected to the cylinder head; and
a fuel injection valve held by the cylinder head at a position closer to the cylinder body than a position of the exhaust port and which supplies a fuel mist directly to the combustion chamber by jetting the fuel mist toward the combustion chamber; wherein
the fuel injection valve is arranged below the exhaust port and above the combustion chamber;
the fuel injection valve is arranged on a side of the cylinder head that includes the exhaust port; and
the fuel injection valve is angled downward.

8. The four-stroke engine according to claim 7, wherein the four-stroke engine is a V-type engine including a plurality of cylinders arranged along a V-shaped line, and the fuel injection valve is disposed inside the V-shaped line.

9. The four-stroke engine according to claim 7, wherein the four-stroke engine is a V-type engine including a plurality of cylinders arranged along a V-shaped line, and the fuel injection valve is disposed outside the V-shaped line.

10. The four-stroke engine according to claim 7, wherein the cylinder head includes a water jacket located between the exhaust port and the fuel injection valve.

11. The four-stroke engine according to claim 10, wherein water from outside the four-stroke engine is supplied to the water jacket.

12. An outboard motor comprising:
the four-stroke engine according to claim 11; and
a water pump that supplies the water from outside the outboard motor to the water jacket by being driven by the four-stroke engine.

13. A four-stroke engine comprising:
a cylinder head including a combustion chamber, an intake port that communicates with the combustion chamber, and an exhaust port that communicates with the combustion chamber;
a cylinder body connected to the cylinder head; and
a fuel injection valve held by the cylinder head at a position closer to the cylinder body than a position of the exhaust port and which supplies a fuel mist directly to the combustion chamber by jetting the fuel mist toward the combustion chamber; wherein
the cylinder head includes a pair of the exhaust ports including respective openings open to the combustion chamber;
the fuel injection valve is arranged between the pair of the exhaust ports when the cylinder head is viewed from a side of the combustion chamber;
the fuel injection valve is arranged below the pair of the exhaust ports and above the combustion chamber;
the fuel injection valve is arranged on a side of the cylinder head that includes the pair of the exhaust ports; and
the fuel injection valve is angled downward.

14. The four-stroke engine according to claim 13, wherein the four-stroke engine is a V-type engine including a plurality of cylinders arranged along a V-shaped line, and the fuel injection valve is disposed inside the V-shaped line.

15. The four-stroke engine according to claim 13, wherein the four-stroke engine is a V-type engine including a plurality of cylinders arranged along a V-shaped line, and the fuel Injection valve is disposed outside the V-shaped line.

16. The four-stroke engine according to claim 13, wherein the cylinder head includes a water jacket located between the exhaust port and the fuel injection valve.

17. The four-stroke engine according to claim 16, wherein water from outside the four-stroke engine is supplied to the water jacket.

18. An outboard motor comprising:
the four-stroke engine according to claim 17; and
a water pump that supplies the water from outside the outboard motor to the water jacket by being driven by the four-stroke engine.

19. An engine comprising:
a cylinder head including a combustion chamber, an intake port that communicates with the combustion chamber, and an exhaust port that communicates with the combustion chamber;
a cylinder body connected to the cylinder head; and
a fuel injection valve held by the cylinder head which supplies a fuel mist directly to the combustion chamber by jetting the fuel mist toward the combustion chamber; wherein
the fuel injection valve is arranged below the exhaust port and above the combustion chamber;
the fuel injection valve is arranged on a side of the cylinder head that includes the exhaust port; and
the fuel injection valve is angled downward.

20. A four-stroke engine comprising:
a cylinder head including a combustion chamber, an intake port that communicates with the combustion chamber, and an exhaust port that communicates with the combustion chamber;
a spark plug that burns an air-fuel mixture in the combustion chamber;
a cylinder body connected to the cylinder head; and
a fuel injection valve held by the cylinder head at a position closer to the cylinder body than a position of the exhaust port and which supplies a fuel mist directly to the combustion chamber by jetting the fuel mist toward the combustion chamber; wherein
the fuel injection valve is arranged below the exhaust port and above the combustion chamber;
the fuel injection valve is arranged on a side of the cylinder head that includes the exhaust port; and
the cylinder head includes a water jacket located between the exhaust port and the fuel injection valve.

* * * * *